Figure 3:
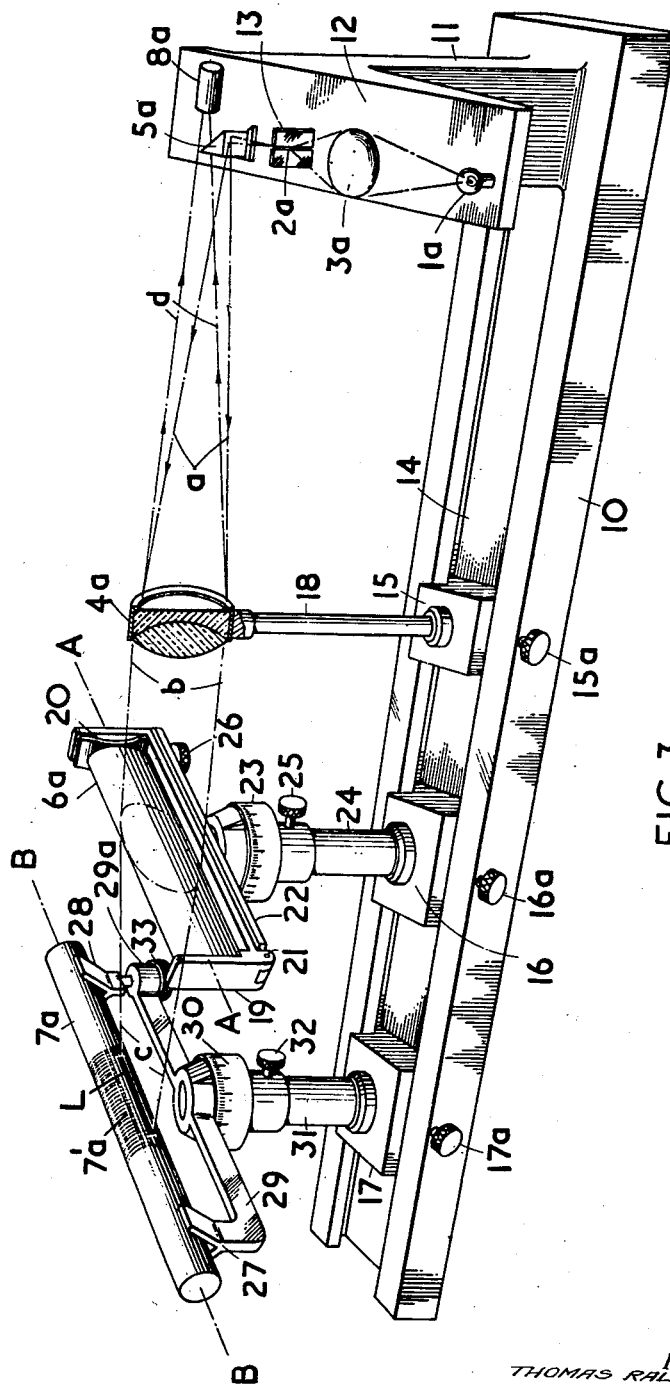

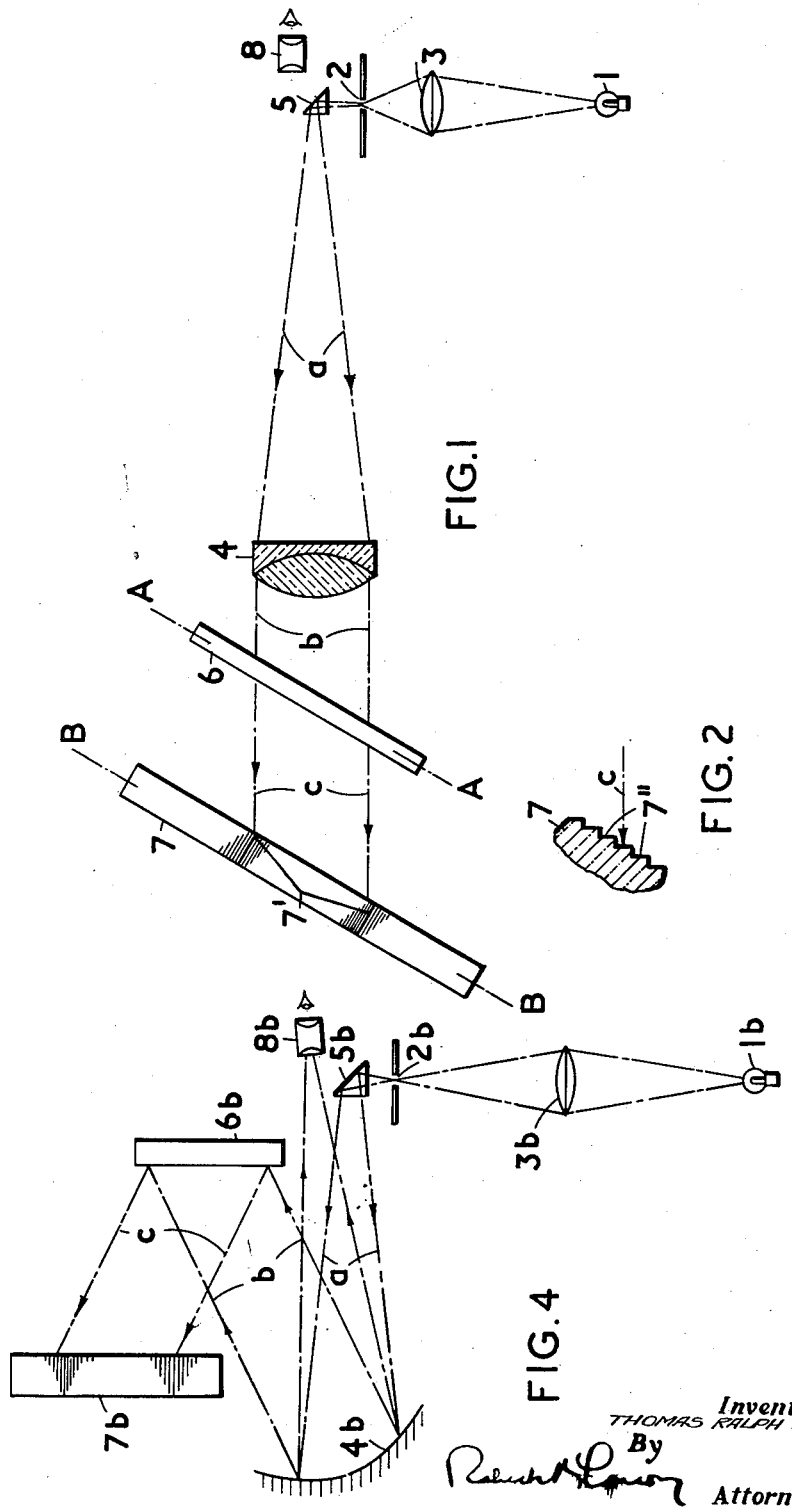

Patented Mar. 9, 1954

2,671,376

UNITED STATES PATENT OFFICE 2,671,376

SPECTROSCOPIC APPARATUS WITH RULED CYLINDER AS THE DISPERSING MEANS

Thomas Ralph Merton, Maidenhead Thicket, England, assignor to National Research Development Corporation, London, England, a British corporation Application August 21, 1951, Serial No. 242,833

Claims priority, application Great Britain August 29, 1950

9 Claims. (Cl. 88—14)

This invention relates to apparatus of the form of a spectroscope or the like such as a spectrograph, and is concerned more especially with improvements whereby in apparatus of the character mentioned there can be utilised, as the dispersing element, a diffraction grating constituted by a cylinder with diffraction rulings thereon.

As is known, in spectroscopes and spectrographs it is usual to employ as the dispersing element a prism or prisms on the one hand, or a diffraction grating on the other. Diffraction gratings for this purpose are usually ruled on a flat or concave surface with a diamond. To obtain good definition in the spectrum it is essential that the rays of light from the slit of the spectroscope or spectrograph should fall on the dispersing element at the same angle and this is achieved, when flat gratings are used, either by means of a collimating lens located at an appropriate distance from the slit and rendering the rays from the slit parallel to one another, or alternatively by an off-centre paraboloid reflector suitably disposed in position to render the rays from the slit parallel. When a concave grating is used, a collimating lens or reflector may be dispensed with for most purposes.

In the co-pending patent application Serial No. 198,078, there is described an improved method of ruling a diffraction grating in the form of a fine helix on a cylinder and gratings ruled in the manner described in that application are substantially free from the periodic errors which are difficult to avoid by other methods. In a further co-pending patent application Serial No. 212,930, a method is described of reproducing onto a flat surface the rulings that have been made on a cylinder such as by the method of ruling described in patent application Serial No. 198,078 aforesaid. This reproduction of rulings onto a flat surface provides, of course, a plane diffraction grating.

Now, it is an object of the present invention so to arrange the optical system of spectroscopic or like apparatus that a diffraction grating ruled on a cylinder can be used as the dispersing element in the apparatus, the ruling having been conveniently formed by the method described in the patent application Serial No. 198,078 aforesaid, though the use of a cylinder which has been provided in some other way with equivalent ruling is not excluded.

With the foregoing object in view the invention resides broadly in providing the optical system with light directing means including a cylindrical lens or a cylindrical reflector arranged in the path of light from the source in such a way that the rays which are passed by the said lens or reflector, and which are thereby capable of forming a line focus, are directed so as to fall at the same angle upon the surface of the ruled cylinder.

Thus, in a convenient arrangement embodying the invention and wherein the light which issues through a slit is converted into a beam of parallel rays by means of a collimating lens (or an off-centre paraboloid reflector), the cylindrical lens (or cylindrical reflector) is disposed obliquely in the beam of parallel rays, whilst the ruled cylinder is mounted with its axis arranged accurately parallel to the axis of the cylindrical lens (or cylindrical reflector) and in a plane at right angles to the slit.

The invention is readily applicable in connection with the well known Littrow spectroscope or spectrograph arrangement by means of which the same lens is used as collimator and telescope, the light from the slit being directed towards the lens by means of a small right angle reflecting prism and observations being made, by means of an eyepiece, of the image either just above or below or to one side of the right angle prism. By way of example, therefore, the application of the invention to such an arrangement will now be described with reference to the accompanying drawings.

Of these drawings, Fig. 1 is a diagrammatic representation of one form of the arrangement embodying the invention; Fig. 2 is a fragmentary view showing on a greatly enlarged scale the nature of the cylindrical diffraction grating surface and its disposition with respect to the incident light; Fig. 3 is a perspective view showing in greater detail the components of the system represented by Fig. 1, whilst Fig. 4 illustrates diagrammatically a modification using appropriate reflectors in place of certain lenses.

Referring firstly to Fig. 1, light from a source 1 is brought to a focus on a spectroscope slit 2 by means of a condensing lens 3 and is reflected along a path $a$ towards a collimating lens 4 by means of a reflecting prism 5. The parallel rays $b$ that emerge from the collimating lens 4 then fall, according to the invention, on a cylindrical lens 6 placed obliquely in the beam of rays $b$ and lying on an axis A—A parallel to the axis B—B of a more remotely lying ruled cylinder 7 which constitutes the light dispersing element. The ruling on the cylinder 7 is in the form of a fine helix 7′, conveniently produced by the method described in patent application Serial No. 198,078.

The distance from the cylindrical lens 6 to the ruled cylinder 7 is adjusted so that rays proceeding from a point in the centre of the slit 2 would, by means of the cylindrical lens 6, follow the path indicated at c and be focussed as a line on the axis B—B of the ruled cylinder 7. The axis B—B of the cylinder 7 is disposed, in relation to the optic axis of the collimator 4, in such a way that the rays c fall on the ruled cylinder 7 at right angles, or substantially so, to the individual flat facets of the cuts made by the diamond in ruling the grating. Thus, as indicated in Figure 2 the helical cuts on the surface of the cylinder 7 are, by reason of a suitable inclination of the cylinder, caused to present facets as at 7'' onto which the incident rays as at c are directed at right angles. In this connection it is to be understood that the helical cuts on the cylinder 7 are in fact very close together and may be of the order of 2,000 to the inch, or even up to 20,000 to the inch. Conveniently, the cylinder 7 is formed of metal such as stainless steel, having a diameter of the order of 1 inch and with the helical ruling extending over a length of about 8 inches. With the arrangement illustrated, the order of the spectrum observed in the eyepiece 8 is that order into which the greater part of the energy is thrown. It is to be noted that all the rays fall on the surface of the ruled cylinder 7 at the same angle. Under these conditions a spectrum showing critical definition is seen in the eyepiece 8.

Referring now to Fig. 3 in which the system represented by Fig. 1 is illustrated in greater detail, and wherein parts corresponding to certain of those shown diagrammatically in Fig. 1 are given the same reference numerals followed by the suffix a, the numeral 10 designates a base in the form of an elongated bedplate. At one end of the base there extends an upright 11 forming a horizontal platform 12 for supporting a light source 1a, a condensing lens 3a, a vertically disposed spectroscope diaphragm 13 with a vertical slit 2a therein, a reflecting prism 5a and a neighbouring eyepiece 8a. The bedplate 10 is longitudinally grooved at 14 for slidably supporting blocks 15, 16 and 17 on which are mounted respectively the collimating lens 4a, the cylindrical lens 6a and the ruled cylinder 7a. For fixedly locating the blocks 15, 16 and 17 in adjusted position within the groove 14 of the bedplate 10, locking screws 15a, 16a and 17a respectively are provided. The collimating lens 4a is mounted at the head of a post 18 extending vertically from the block 15. The cylindrical lens 6a is held in a carrier 19, with a bowed spring friction engagement at 20, the carrier 19 being hinged at 21 with respect to an under-support 22 capable of rotation about a vertical axis relatively to a mount 23 which itself can be adjusted in height on a post 24, the adjustment being maintained by means of a fixing screw 25. To provide for the requisite adjustment of the cylindrical lens 6a so that its axis A—A lies truly horizontally, in the case where the slit 2a is lying truly vertical as assumed in Fig. 3, the carrier 19, and therewith the lens 6a, is arranged so as to be rocked about the hinge 21 by operation of a micrometer adjustment screw 26 passing through the under-support 22 and engaging with the carrier 19 at the end remote from the hinge 21. The ruled cylinder 7a is mounted in crutch pieces 27, 28 forming part of an under-support 29 adjustable rotationally on a mount 30 the height of which is adjustable on a vertical post 31 extending from the block 17, the latter adjustment being maintained by means of a fixing screw 32. To provide for any adjustment that may be required to bring the axis B—B of the cylinder 7a truly horizontal, in the assumed case where the slit 2a is lying truly vertical, the clutch piece 28 is mounted in a boss portion 29a of the under-support 29 so as to be capable of vertical adjustment by means of an adjusting screw 33.

The apparatus illustrated in Fig. 3 is set up in accordance with the diagrammatic representation shown in Fig. 1. Thus, the rays of light a proceeding from the prism 5a are formed into the parallel rays b by means of the collimating lens 4a and next encounter the obliquely disposed cylindrical lens 6a whence they become directed so as to fall at the same angle, in the form of rays c, onto the helical ruling 7'a on the cylinder 7a, it being understood that, in addition to arranging for the axes A—A and B—B to be adjusted parallel to one another, the distance from the cylindrical lens 6a to the ruled cylinder 7a is adjusted so that the rays c would be focussed as a line on the axis B—B, with the result that where the cylinder 7a has a diameter of the order of 1 inch the light engages along the periphery of the cylinder as a thin line indicated at L. The observation of a spectrum resulting from the incident light on the line L can be made by viewing through the eyepiece 8a the reflected rays indicated at d.

In the modification represented by Fig. 4, wherein parts the same as, or equivalent to, certain parts shown in Fig. 1 are given the same reference numerals followed by the suffix b, light from a source 1b is brought to a focus on a slit 2b by means of the condensing lens 3b and is reflected along the path a towards an off-centre paraboloid reflector 4b by means of the reflecting prism 5b. The parallel rays b that are reflected by the reflector 4b then fall on a cylindrical reflector 6b placed obliquely in the beam of rays b whence reflected rays c are directed on to the ruled cylinder 7b disposed parallel to the cylindrical reflector 6b and constituting the light dispersing element. Observation of the spectrum due to the rulings on the cylinder 7b which may be constituted and arranged generally as described with reference to Figs. 1 to 3 can then be made by viewing through the eyepiece 8b the reflected rays indicated at d.

The three important attributes of a spectroscope or spectrograph are the resolving power, the dispersion and the light-gathering power. With the arrangements described above the resolving power and the dispersion can be calculated in precisely the same manner as in the case of a grating ruled on a flat surface. In the case of a flat grating the light-gathering power is proportional to the area of the ruled surface, but with the arrangement in accordance with the present invention in which the grating is ruled on a cylinder and used in conjunction with a cylindrical lens (or cylindrical reflector) the light-gathering power is independent of the diameter of the cylinder. In the case of a flat grating of very large ruled area the total distance travelled by the ruling diamond may be so great as to impair the diamond through wear before the whole area can be covered, but with gratings ruled on cylinders this difficulty should not arise.

I claim:

1. An optical system for use in apparatus of the character described, comprising a source of light, a cylinder having a helical ruling thereon so as to provide diffraction grating characteristics, a device having a spectroscopic slit therein, a condensing lens interposed between said source and said slit for bringing the light from the source to a focus on said slit, a reflecting prism at the side of said slit remote from said condensing lens, a collimating lens toward which said prism serves to reflect the light issuing through said slit, a cylindrical lens spaced from said collimating lens and disposed obliquely in the beam of rays from said collimating lens, said cylindrical lens having its axis lying parallel to the axis of said helically ruled cylinder which is more remotely lying, and being capable of forming a line focus of light and causing the rays of light to fall at the same angle upon, and as a line beam of light along, the surface of said cylinder, and means for adjustably supporting said cylindrical lens and said cylinder for permitting the distance from said cylindrical lens to said cylinder to be adjusted so that rays proceeding from a point in the center of said slit would be focused as a line on the axis of said cylinder.

2. An optical system for use in apparatus of the character described, comprising a source of light, a cylinder having a helical ruling thereon so as to provide diffraction grating characteristics, a device having a spectroscopic slit therein, a condensing lens interposed between said source and said slit for bringing the light from the source to a focus on said slit, a reflecting prism at the side of said slit remote from said condensing lens, a collimating lens toward which said prism serves to reflect the light issuing through said slit, a cylindrical lens spaced from said collimating lens and disposed obliquely in the beam of rays from said collimating lens, said cylindrical lens having its axis lying parallel to the axis of said helically ruled cylinder which is more remotely lying, and being capable of forming a line focus of light and causing the rays of light to fall at the same angle upon, and as a line beam of light along, the surface of said cylinder, a carrier for supporting said cylindrical lens and having means for rendering said cylindrical lens adjustable selectively in height, rotationally about a vertical axis, and angularly in a vertical plane; a further carrier for supporting said cylinder and having means for rendering said cylinder adjustable selectively in height, rotationally about a vertical axis, and angularly in a vertical plane, and means for adjusting the relative separation between said carriers whereby the distance between said lens and said cylinder can be varied.

3. An optical system for use in apparatus of the character described, comprising a source of light, a light dispersing element consisting of a cylinder having a helical ruling thereon so as to provide diffraction grating characteristics, and optical means interposed between said source of light and said cylinder, said optical means including an optical device capable of forming a line focus of light and being so arranged in relation to said source of light and said cylinder that the rays of light passed by said optical device are caused to fall at the same angle upon, and as a line beam along, the surface of the cylinder.

4. An optical system as set forth in claim 3, in which the optical device comprises a cylindrical lens.

5. An optical system as set forth in claim 3, in which the optical device comprises a cylindrical reflector.

6. An optical system for use in apparatus of the character described, comprising a source of light, a light dispersing element consisting of a cylinder having a helical ruling formed thereon so as to offer individual flat facets as a result of a helical cutting operation at a fine pitch, to provide diffraction grating characteristics, optical means interposed between said source of light and said cylinder, said optical means including an optical device capable of forming a line focus of light, collimating means for directing parallel rays of the light toward said optical device, and means for disposing said cylinder with its axis inclined in relation to the optic axis of said collimating means in such a way that the rays from said optical device fall on said cylinder substantially at right angles to said flat facets.

7. An optical system as set forth in claim 6, in which the collimating means is in the form of a lens.

8. An optical system as set forth in claim 6, in which the collimating means is in the form of a paraboloid reflector.

9. An optical system for use in apparatus of the character described, comprising a source of light, a light dispersing element consisting of a cylinder having a helical ruling thereon so as to provide diffraction grating characteristics, and optical means interposed between said source of light and said cylinder, said optical means including means forming a line focus of light, and means directing the light rays of said line focus of light onto said cylinder at the same angle.

THOMAS RALPH MERTON.

References Cited in the file of this patent

UNITED STATES PATENTS

| Number | Name | Date |
|---|---|---|
| 551,769 | Jacobson | Dec. 24, 1895 |
| 1,828,328 | Legg | Oct. 20, 1931 |
| 2,282,643 | Cutting | May 12, 1942 |
| 2,330,694 | Estey et al. | Sept. 28, 1943 |
| 2,463,280 | Kaehni et al. | Mar. 1, 1949 |